United States Patent
Opshaug et al.

(10) Patent No.: US 9,026,151 B2
(45) Date of Patent: May 5, 2015

(54) BASE STATION POSITIONING USING DOPPLER OBSERVABLES, POSITION, AND VELOCITY

(71) Applicant: QUALCOMM Incorporated, San Diego, CA (US)

(72) Inventors: Guttorm R. Opshaug, Redwood City, CA (US); Benjamin A. Werner, San Carlos, CA (US); Weihua Gao, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/042,579

(22) Filed: Sep. 30, 2013

(65) Prior Publication Data

US 2015/0094100 A1   Apr. 2, 2015

(51) Int. Cl.
 *H04W 24/00* (2009.01)
 *H04W 64/00* (2009.01)

(52) U.S. Cl.
 CPC .................................. *H04W 64/003* (2013.01)

(58) Field of Classification Search
 CPC ............................ H04W 64/00; H04W 64/003
 See application file for complete search history.

(56) References Cited

U.S. PATENT DOCUMENTS

| | | |
|---|---|---|
| 5,252,980 A | 10/1993 | Gray et al. |
| 6,184,831 B1 | 2/2001 | Dalby et al. |
| 2007/0021121 A1 | 1/2007 | Lane et al. |
| 2008/0096566 A1* | 4/2008 | Brunner et al. ............... 455/437 |
| 2011/0199260 A1* | 8/2011 | Garrett et al. ............ 342/357.35 |
| 2011/0199916 A1* | 8/2011 | Garrett et al. ................. 370/252 |
| 2011/0238286 A1 | 9/2011 | Roesser |
| 2012/0281672 A1 | 11/2012 | Ohm et al. |

FOREIGN PATENT DOCUMENTS

WO    WO-2011047709 A1    4/2011

OTHER PUBLICATIONS

International Search Report and Written Opinion—PCT/US2014/057455—ISA/EPO—Dec. 22, 2014.

* cited by examiner

*Primary Examiner* — Ronald Eisner
(74) *Attorney, Agent, or Firm* — Kilpatrick Townsend & Stockton LLP

(57) ABSTRACT

Methods, devices, and systems are described for using multiple measurements including Doppler measurements from a mobile device to identify the position of the base station. Repeated Doppler and velocity measurements from different locations, with measurement groups taken at the same time or within a certain time frame, may be used to identify the location of a base station with which the mobile device is communicating.

25 Claims, 8 Drawing Sheets

| S502 | Determining within a first time period, by a mobile device, (a) a first velocity associated with the mobile device and a first position and (b) a first Doppler measurement between the mobile device and a base station, wherein the first Doppler measurement is referenced to a local stable clock signal of the mobile device |

| S504 | determining within a second time period, by the mobile device, (c) a second velocity associated with the mobile device and a second position and (d) a second Doppler measurement between the mobile device and the base station, wherein the second Doppler measurement is referenced to the local stable clock signal of the mobile device |

| S506 | determining a position of the base station from at least the first velocity, the second velocity, the first position, the second position, the first Doppler measurement, and the second Doppler measurement; wherein a first direction vector from the first position to the position of the base station is different from a second direction vector from the second position to the position of the base station |

FIG. 5A

BASE STATION POSITIONING USING DOPPLER OBSERVABLES, POSITION, AND VELOCITY

FIELD

Aspects of the disclosure relate to base station positioning, and in particular, to using multiple measurements including Doppler measurements from a mobile device to identify the position of the base station.

BACKGROUND

Determining the position of base stations in a network is, in many systems, a first step in finding the location of a mobile device. Examples of known methods for this include methods involving signal timing and observed time difference of arrival between more than one base station. These methods have downsides, including the need for precise timing between a reference clock and the network measurements, and a potential need for many measurements to be made across multiple base stations in a network. Similarly, systems using global navigation satellite systems (GNSS) in conjunction with mobile devices to locate base stations require precise reference clock synchronization. Improved systems and methods determining the relative location between a base station and a mobile device may thus be desirable.

BRIEF SUMMARY

Embodiments described herein include systems, methods, devices, and computer readable media for improved base station positioning using mobile device measurements.

For example, one embodiment comprises a method including determining within a first time period, by a mobile device, (a) a first velocity associated with the mobile device and a first position and (b) a first Doppler measurement between the mobile device and a base station, wherein the first Doppler measurement is referenced to a local stable clock signal of the mobile device; determining within a second time period, by the mobile device, (c) a second velocity associated with the mobile device and a second position and (d) a second Doppler measurement between the mobile device and the base station, wherein the second Doppler measurement is referenced to the local stable clock signal of the mobile device; and determining a position of the base station from at least the first velocity, the second velocity, the first position, the second position, the first Doppler measurement, and the second Doppler measurement; wherein a first direction vector from the first position to the position of the base station is different from a second direction vector from the second position to the position of the base station.

Another embodiment of such a method may include determining a global position of the mobile device using positioning measurements independent of the first velocity, the second velocity, the first position, the second position, the first Doppler measurement, and the second Doppler measurement.

Another embodiment of such a method may include determining within a third time period, by the mobile device, a third velocity of the mobile device and a third Doppler measurement between the mobile device and the base station from a third position; wherein the third position is associated with a third direction vector from the third position to the base station, and wherein the third direction vector is different from both the first direction vector and the second direction vector.

Another embodiment of such a method may function where the first position is an indoor position wherein the indoor position obstructs reception of any potential satellite positioning signal. Another embodiment of such a method may function where the first velocity is determined from an accelerometer of the mobile device.

Another embodiment of such a method may function where the first time period and the second time period occur within a predetermined time difference, the predetermined time difference being based on a stability of the local stable clock signal.

Another embodiment of such a method may function where the mobile device comprises a first clock associated with a global positioning system component, and a second clock that is separate from the global positioning system component, wherein the local stable clock signal is associated with the second clock that is separate from the global positioning system component.

Another embodiment of such a method may function where the first position is a relative position in a relative coordinate system defined by the mobile device, and wherein the second position is determined relative to the first position within the relative coordinate system.

Another embodiment of such a method may include determining a global reference point for the relative coordinate system; and determining a global position of the base station using the position of the base station and the global reference point.

Another embodiment of such a method may include receiving a global position of the base station from the base station; and determining a global position of the mobile device using the global position of the base station and the position of the base station determined relative to the mobile device using the first Doppler measurement and the second Doppler measurement.

Another embodiment of such a method may function where the first Doppler measurement is performed using a non-data reference signal communicated between the mobile device and the base station. Another embodiment of such a method may function where the non-data reference signal is a Positioning Reference Signal (PRS), Cell Specific Reference Signal (CRS), Primary Synchronization Signal (PSS), or Secondary Synch Signal (SSS). Another embodiment of such a method may function where the non-data reference signal is a pilot reference signal as part of a code division multiple access system.

An alternative embodiment may be a mobile device comprising: a memory; a velocity hardware module used to determine a first velocity associated with the mobile device and a first position and a second velocity associated with the mobile device and a second position, wherein the velocity hardware module is coupled to the memory; a Doppler positioning module used to take a first Doppler measurement between the mobile device and a base station from the first position and a second Doppler measurement between the mobile device and the base station from the second position, wherein the first Doppler measurement and the second Doppler measurement are referenced to a local stable clock signal of the mobile device, and wherein the Doppler positioning module is coupled to the memory; and a processor coupled to the memory, the velocity hardware module, and the Doppler positioning module, wherein the processor is configured to determine a position of the base station from at least the first velocity, the second velocity, the first position, the second position, the first Doppler measurement, and the second Doppler measurement; wherein the first Doppler measurement is associated with the first velocity and each is measured within a first time period; wherein the second Doppler measurement is associated with the second velocity and each is measured within a second time period that is different from the first time period; and wherein a first direction vector from the first position to the position of the base station is different from a second direction vector from the second position to the position of the base station.

Another embodiment of such a device may function where the velocity hardware module comprises an inertial sensor. Another embodiment of such a device may function where the velocity hardware module comprises a gyroscope. Another embodiment of such a device may include a global positioning system module coupled to the processor, wherein the global positioning system module comprises a clock source that is separate from a source of the local stable clock signal.

Another alternative embodiment may be a device comprising: means for determining within a first time period, by the mobile device, (a) a first velocity associated with the mobile device and a first position and (b) a first Doppler measurement between the mobile device and a base station, wherein the first Doppler measurement is referenced to a local stable clock signal of the mobile device; means for determining within a second time period, by the mobile device, (c) a second velocity associated with the mobile device and a second position and (d) a second Doppler measurement between the mobile device and the base station, wherein the second Doppler measurement is referenced to the local stable clock signal of the mobile device; and means for determining a position of the base station from at least the first velocity, the second velocity, the first position, the second position, the first Doppler measurement, and the second Doppler measurement; wherein a first direction vector from the first position to the position of the base station is different from a second direction vector from the second position to the position of the base station.

Another embodiment of such a device may include means for determining within a third time period, by the mobile device, a third velocity of the mobile device and a third Doppler measurement between the mobile device and the base station from a third position; wherein the third position is associated with a third direction vector from the third position to the base station, wherein the third direction vector is different from both the first direction vector and the second direction vector; and wherein the first position is an indoor position wherein the indoor position obstructs reception of any potential satellite positioning signal.

Another embodiment of such a device may include means for determining a global reference point for a relative coordinate system; and means for determining a global position of the base station using the position of the base station and the global reference point.

Another embodiment of such a device may include means for receiving a global position of the base station from the base station; and means for determining a global position of the mobile device using the global position of the base station and the position of the base station determined relative to the mobile device using the first Doppler measurement and the second Doppler measurement.

Another alternative embodiment may be a non-transitory computer readable medium comprising instructions that, when executed by a processor, cause a mobile device comprising the processor to: determine, within a first time period, (a) a first velocity associated with the mobile device and a first position and (b) a first Doppler measurement between the mobile device and a base station, wherein the first Doppler measurement is referenced to a local stable clock signal of the mobile device; determine within a second time period (c) a second velocity associated with the mobile device and a second position and (d) a second Doppler measurement between the mobile device and the base station, wherein the second Doppler measurement is referenced to the local stable clock signal of the mobile device; and determine a position of the base station from at least the first velocity, the second velocity, the first position, the second position, the first Doppler measurement, and the second Doppler measurement; wherein a first direction vector from the first position to the position of the base station is different from a second direction vector from the second position to the position of the base station.

Another embodiment of such a non-transitory computer readable medium may function where the first Doppler measurement is performed using a non-data reference signal communicated between the mobile device and the base station. Another embodiment of such a non-transitory computer readable medium may function where the non-data reference signal is a Positioning Reference Signal (PRS), Cell Specific Reference Signal (CRS), Primary Synchronization Signal (PSS), or Secondary Synch Signal (SSS). Another embodiment of such a non-transitory computer readable medium may function where the non-data reference signal is a pilot reference signal as part of a code division multiple access system.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 5A describes on potential method according to the embodiments described herein;

DETAILED DESCRIPTION

Aspects of the disclosure relate to networked computing technologies and location services. In particular, aspects of the disclosure relate to systems, methods, apparatus, and computer readable media for determining the position of a base station in a network using Doppler observables between the base station and a mobile device.

Embodiments described herein provides a way to find the position of base stations using Doppler measurements without requiring clock synchronization between multiple devices. One embodiment for such a system includes a clock frequency at local oscillator that is relatively stable, and an ability to measure mobile device velocity. Because a velocity measurement measures a direction and speed of a mobile device, and a Doppler measurement can be used to determine a speed towards or away from a base station, these two measurements may be used to determine the direction of a base station from the point at which the measurements were taken. If such measurements are taken from multiple locations, the point at which the direction vectors cross estimates the position of the base station. This information may then be used to determine or improve relative or absolute positions of the base station or the mobile device, depending on what additional information is available. Thus, in certain embodiments, a person walking or driving with a mobile device configured to take these measurements may automatically gather information about the presence of base stations. This information may be used to update a database of base station locations, or may be used to track the position of the mobile device with respect to known base station positions. Such embodiments described herein include numerous benefits over known systems, including the ability to make base station location determinations using Doppler measurements in an indoor environment where satellite signals used for positioning may be obstructed. The embodiments further may not have a need to synchronize clocks across multiple devices, but may instead simply rely on a stable internal clock source, which reduces overhead in synchronizing with other devices.

Figure 1:
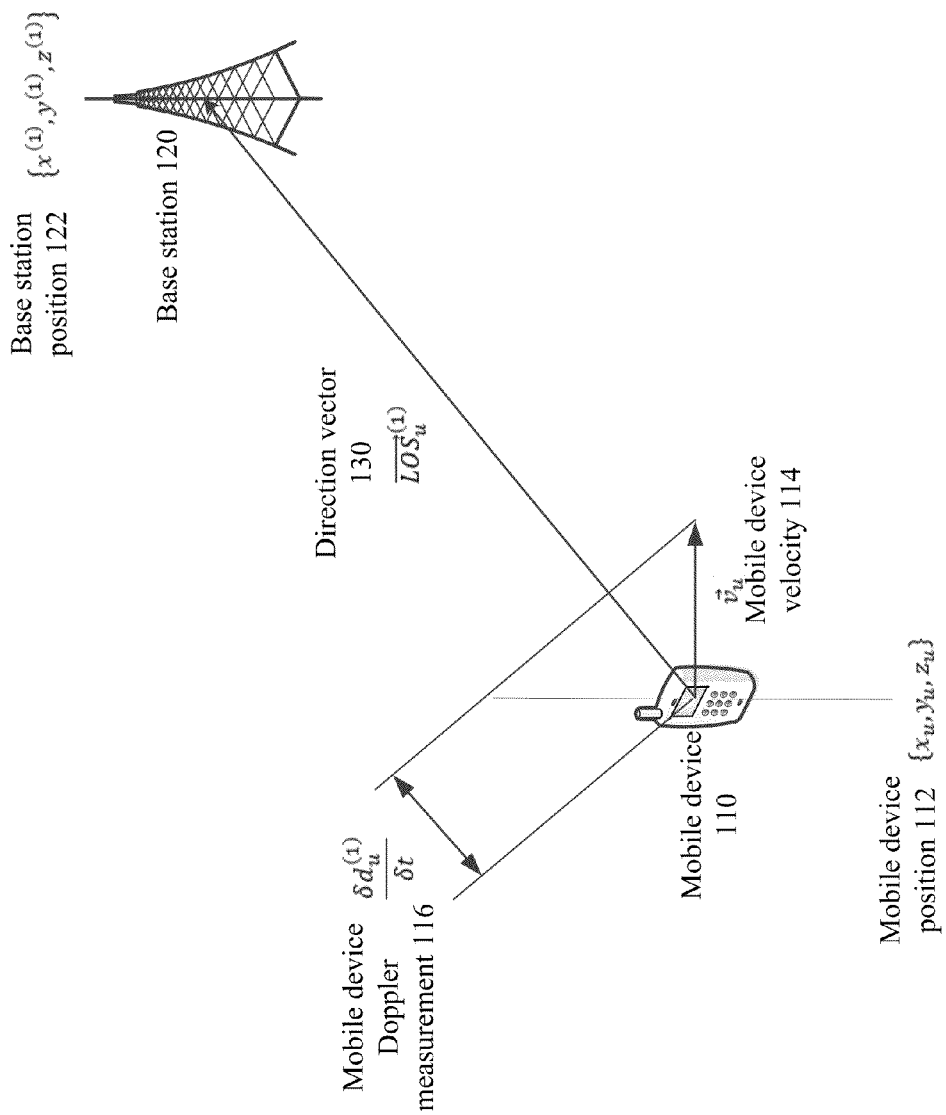
FIG. 1 describes a system that may function for base station positioning in accordance with certain embodiments described herein.

FIG. 1 shows one potential system for making such measurements, with a single measurement illustrated. While all calculations and measurements may be done in three dimensions, for simplification, all calculations are described as if there is no height difference between mobile devices and base stations. Certain implementations may implement this assumption, and as long as the height of the mobile device is small compared to the distance from the device to the base station, any errors introduced by this assumption will be small.

FIG. 1 shows mobile device 110 and base station 120. Mobile device is associated with multiple characteristics, including position 112, velocity 114, and Doppler measurement 116. In FIG. 1, the mobile device and the base station are separated by a direction vector 130, labeled as LOS having a direction pointing from mobile device 110 to base station 120. The mobile device has a velocity 114 labeled as Vu.

Doppler measurement 116 is labeled as:

$$\frac{\delta d_u^{(1)}}{\delta t} \tag{1}$$

and indicates the change in distance over time from the mobile device to the base station. In turn, when the velocity of the user is known, the Doppler measurement implies a direction of the signal with respect to the mobile device position.

The assumption of no height difference discussed above allows FIG. 1 to be considered a top down snapshot view of a moving mobile device. Mobile device 110 may include sensors which enable a determination of both the magnitude and direction of velocity 114. Doppler measurement 116 gives the magnitude of the velocity in the direction of the base station 120. This can be considered as two sides of the right triangle seen in FIG. 1 with velocity 114 as the hypotenuse. Using the magnitude and direction of velocity 114, and the magnitude of the velocity along unknown direction vector 130, the direction vector can be calculated.

Another way of considering this is as follows.

$$\omega_u^{(1)} \tag{2}$$

is the Doppler observed by mobile device 110.

$$\frac{\delta d_u^{(1)}}{\delta t} \tag{1}$$

is Doppler measurement 116 and is the measured change of distance between mobile device 110 and base station 120.

$$F^{(1)} \tag{3}$$

is the frequency offset of base station 120 with respect to a common frequency standard.

$$f_u \tag{4}$$

is the frequency offset of user, u, with respect to the common frequency standard. The Doppler shift observed will be:

$$\omega_u^{(1)} = \frac{\delta d_u^{(1)}}{\delta t} + F^{(1)} - f_u \tag{5}$$

The relative velocity between mobile device 110, and base station 120 can be re-written as:

$$\frac{\delta d_u^{(1)}}{\delta t} = \left(\vec{v}^{(1)} - \vec{v}_u\right) \cdot \overrightarrow{LOS}_u^{(1)} \tag{6}$$

where $$\vec{v}^{(1)} \tag{7}$$

is the velocity of the base station 110 in a common reference frame, which will be assumed to be 0

$$\vec{v}_u \tag{8}$$

is the velocity of mobile device 120, in a common reference frame, and $$\overrightarrow{LOS}_u^{(1)} \tag{9}$$

is the direction vector 130, which is a line-of-sight unit vector between mobile device 110 and base station 120.

Merging $$\omega_u^{(1)} = \frac{\delta d_u^{(1)}}{\delta t} + F^{(1)} - f_u \tag{5}$$

and $$\frac{\delta d_u^{(1)}}{\delta t} = \left(\vec{v}^{(1)} - \vec{v}_u\right) \cdot \overrightarrow{LOS}_u^{(1)} \tag{6}$$

results in $$\omega_u^{(1)} = \left(\vec{v}^{(1)} - \vec{v}_u\right) \cdot \overrightarrow{LOS}_u^{(1)} + F^{(1)} - fu \tag{10}$$

For stationary base stations, $\vec{v}^{(1)}=0$, and for stable clock systems the clock frequency error can be eliminated so that so $f_u \approx 0$, and the equation can be reduced to:

$$\omega_u^{(1)} = -\vec{v}_u \cdot \vec{LOS}_u^{(1)} + F^{(1)} \qquad (11)$$

If the user is stationary, then $\vec{v}_u = \vec{0}$ and the equation reduces to $$\omega_u^{(1)} = F^{(1)} \qquad (12)$$

This means that a stationary user with a stable clock can observe the frequency offset of base station 130 directly. However, cell position becomes un-observable if the user is stationary because $\vec{v}_u = \vec{0}$ multiplied by the LOS vector becomes 0. An observed Doppler used to identify Doppler measurement 116 combined with a measurement of velocity 114 in a common reference frame thus enables the determination of direction vector 130. In the extreme examples just mentioned, if a user holding a mobile device 110 is walking directly toward or away from the base station 120, $\omega_u^{(1)}$ is a maximum or minimum value because $$\left| \vec{v}_u \cdot \vec{LOS}_u^{(1)} \right| = |\vec{v}_u|$$

in that situation.

Figure 2:
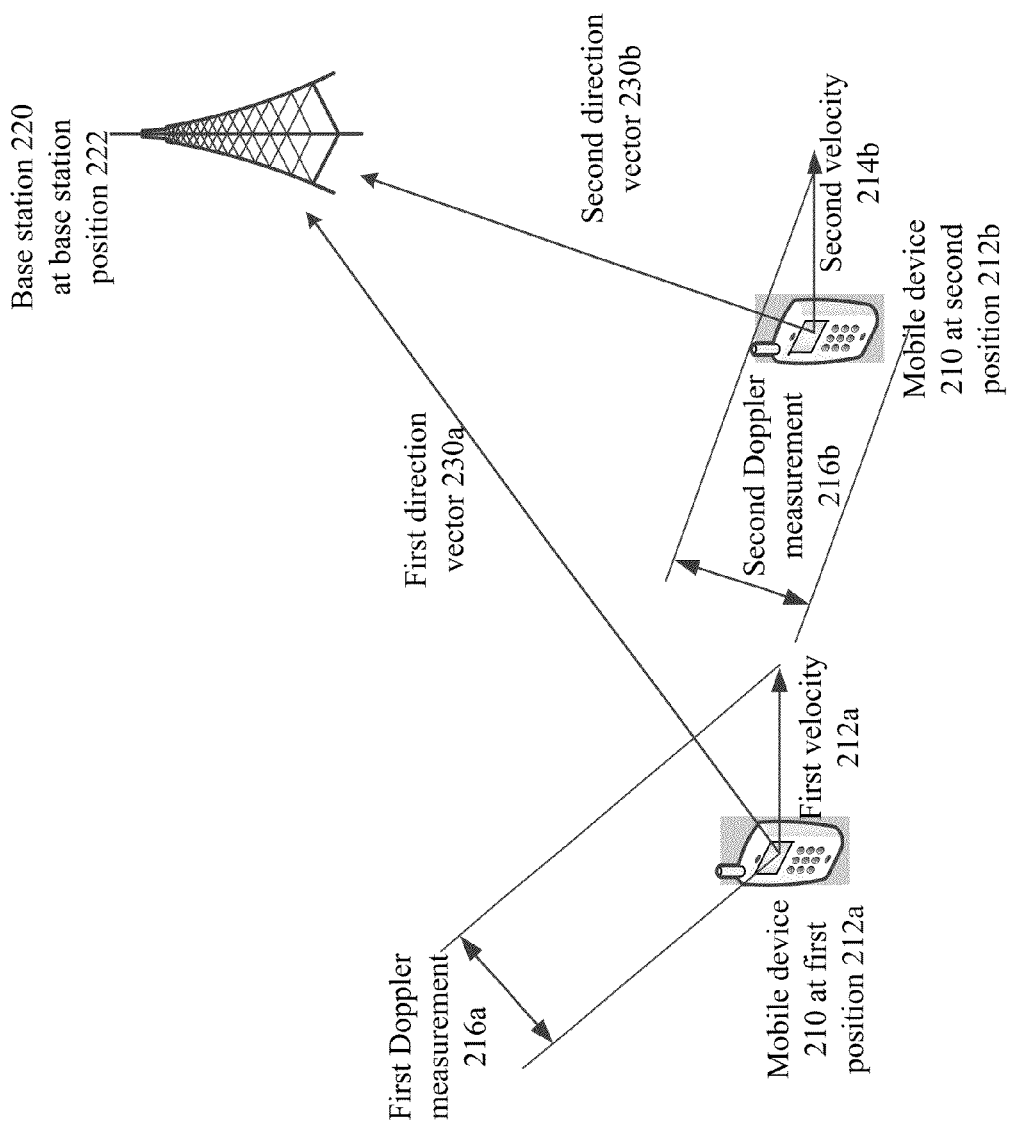
FIG. 2 describes a system that may function for base station positioning in accordance with certain embodiments described herein.
Figure 3:
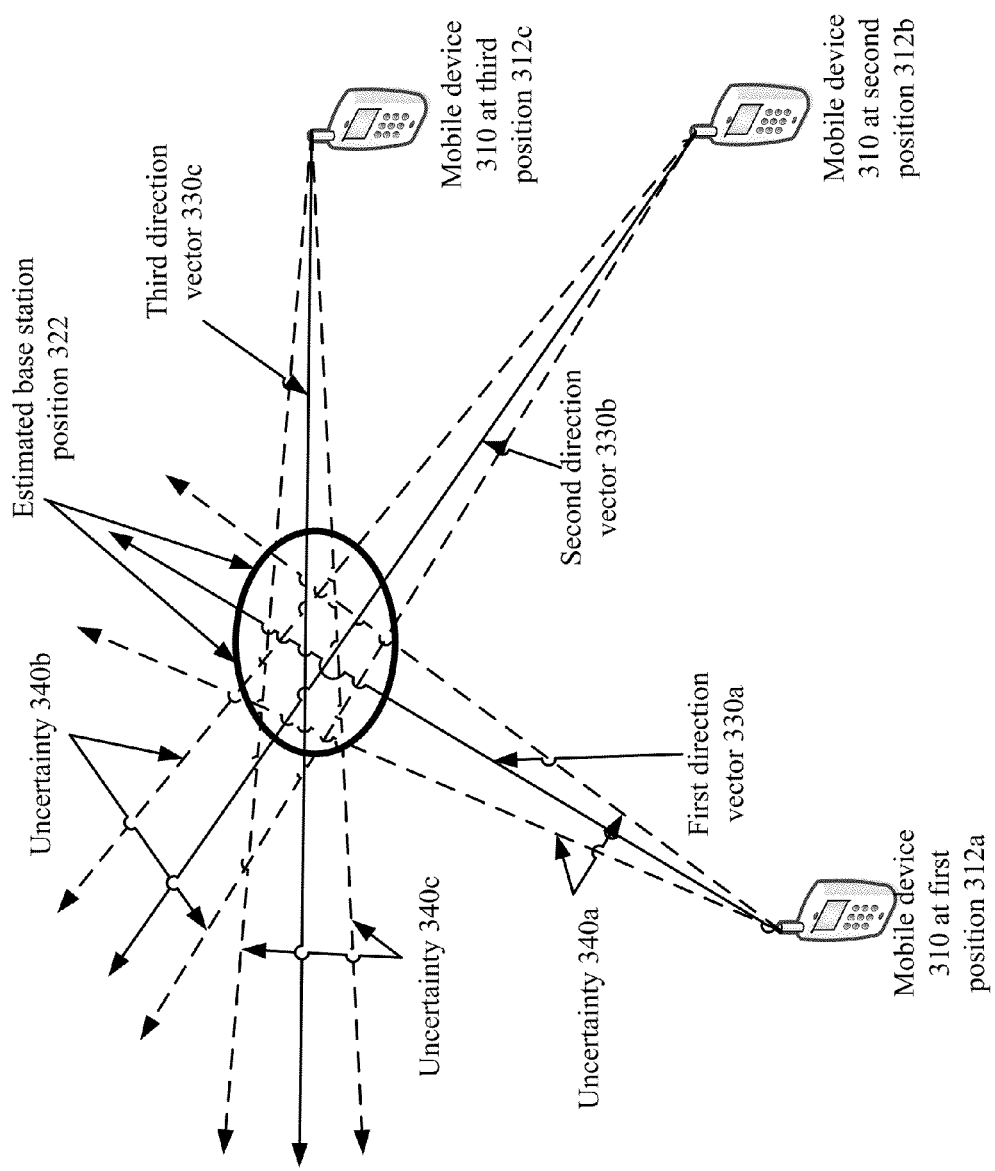
FIG. 3 describes a system that may function for base station positioning in accordance with certain embodiments described herein.

As the mobile device moves, direction vector 130 LOS changes over time. FIGS. 2 and 3 now illustrate this with multiple measurements of direction vectors. When considered in view of the illustration of FIG. 1, because Doppler measurements 116 only essentially measure the change in distance between the mobile device and the base station, if the velocity 114 of the mobile device 110 is known, and a Doppler measurement 116 is taken, velocity 114 and Doppler 116 measurement can be used to identify the direction vector 130 LOS. If multiple such measurements are taken from different positions, the direction of LOS from each position will identify the location of the base station 122.

FIG. 2 shows mobile device 210 and base station 222. At first position 212a, a first Doppler measurement 216a and a first velocity 212a is determined. First position 212a may be measured, or may simply be a relative position identified by mobile device 210. Mobile device 210 then moves to a second position 212b, which may be measured or determined as a relative movement from position 212a, as long as the relative position between first position 212a and second position 212b is known.

After mobile device 210 takes measurements the base station 220 from multiple positions including first position 212a and second position 212b, a system according to various embodiment can calculate the position of the base station (and a frequency offset between the mobile device clock and the base station clock). This may be done by determining first direction vector 230a from first Doppler measurement 216a and first velocity 212a, and then determining second direction vector 230b from second Doppler measurement 216b and second velocity 214b. Vectors 230a and 230b in conjunction with the relative positions of first position 212a and second position 212b enable a determination of a point where first direction vector 230a and second direction 230b cross. This point is the base station position 222. Using more measurement sets of velocity and Doppler measurements will generate a more precise position calculation for a base station position 222. In addition, carrier observations as well as power based Doppler detection can be used for this method.

Another conceptualization of this is to picture the mobile device as positioned on a circle (or sphere if the calculation is to be made in three dimensions) around the base station, where measurement of the velocity and Doppler allow the mobile device to identify an arrow or direction vector toward the center where the base station is located. If measurements are taken from the same place, the arrow simply points in the same direction and no intersection is available to calculate the base station position. With multiple arrows from measurements at different points, the mobile device is able to identify the center, which is the location of the base station. Two measurements with associated direction vectors enable the basic identification of the center of a circle if the system is assuming that the mobile device and base station are in a plane. Three measurements with associated direction vectors enable identification of the base station in three dimensions. Additional measurements enable greater accuracy in determination of the location of the base station.

This again may be considered in terms of the vector equations above, the direction vector 130 may be written as follows in terms of mobile device position 112 and base station position 122:

$$\vec{LOS}_u^{(1)} = \frac{x^{(1)} - x_u}{\sqrt{(x^{(1)} - x_u)^2 + (y^{(1)} - y_u)^2 + (z^{(1)} - z_u)^2}} \cdot \hat{1}_x + \frac{y^{(1)} - y_u}{\sqrt{(x^{(1)} - x_u)^2 + (y^{(1)} - y_u)^2 + (z^{(1)} - z_u)^2}} \cdot \hat{1}_y + \frac{z^{(1)} - z_u}{\sqrt{(x^{(1)} - x_u)^2 + (y^{(1)} - y_u)^2 + (z^{(1)} - z_u)^2}} \cdot \hat{1}_z \qquad (13)$$

Where $\{x^{(1)}, y^{(1)}, z^{(1)}\}$ is the unknown base station position 122, and $\{x_u, y_u, z_u\}$ is the presumed position 112 of mobile device 110. $\hat{1}_x$, $\hat{1}_y$, and $\hat{1}_z$ are unit vectors in the x, y, and z directions respectively.

The expanded original navigation equation from combining (5) with (12) becomes:

$$\omega_u^{(1)} = -\frac{x^{(1)} - x_u}{\sqrt{(x^{(1)} - x_u)^2 + (y^{(1)} - y_u)^2 + (z^{(1)} - z_u)^2}} \cdot v_{u,x} - \frac{y^{(1)} - y_u}{\sqrt{(x^{(1)} - x_u)^2 + (y^{(1)} - y_u)^2 + (z^{(1)} - z_u)^2}} \cdot v_{u,y} - \frac{z^{(1)} - z_u}{\sqrt{(x^{(1)} - x_u)^2 + (y^{(1)} - y_u)^2 + (z^{(1)} - z_u)^2}} \cdot v_{u,z} + F^{(1)} - f_u \qquad (14)$$

Equation 13 is a highly non-linear equation with 4 unknowns, $\{x_{(1)}, y_{(1)}, z_{(1)}\}$ and $F_{(1)} - f_u$. As long as there is little or no change to user clock frequency and eNB clock frequency, one user could make multiple observations of a base station from different mobile device positions to generate a fully determined or over-determined equation set.

While typical synchronized eNBs are frequency accuracy in the range of 50 ppb, practically the number for many implementations in mobile devices is closer to the 1 ppb range. This fact, in addition to having a stationary observation may make $F^{(1)}$ observable and removable from the navigation equation. Again, if a user has a stable clock frequency, so that $f_u \approx 0$, then an equation set can be formed with minimal error. With both assumptions above, a two dimensional position fix can be done with only 2 measurements.

FIG. 3 shows an illustration of uncertainty created by various issues, such as unstable clock frequency or a velocity measurement system that may introduce inaccuracy when matched with a Doppler measurement. FIG. 3 shows mobile device 310 at three different positions, illustrated as first position 312a, second position 312b, and third position 312c. At each position, Doppler and velocity measurements may be used to identify first direction vector 330a, second direction vector 330b, and third direction vector 330c. As described above, measurement errors may cause uncertainty or error in these vector determinations, such that each vector may have uncertainty 340, as shown with uncertainty 340a, 340b, and 340c attached to corresponding direction vectors 330a, 330b, and 330c. Even in the presence of such uncertainty 340, an estimated base station position 322 may be created. While such an estimate may not directly identify a single point of signal origination for a base station, with multiple measurements to reduce the size of estimated base station position 322, certain embodiments of mobile device 310 may provide adequate estimates even when single measurement uncertainty may be greater than several degrees.

Figure 4:
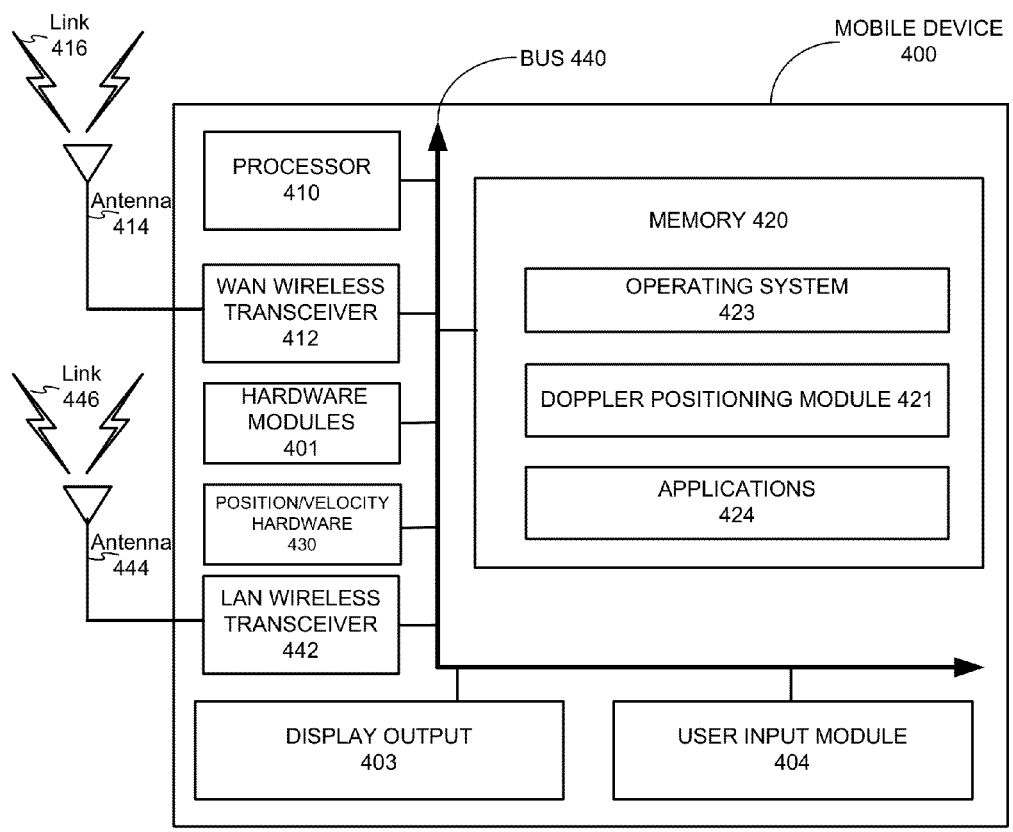
FIG. 4 is one potential example of a mobile device for use with a potential embodiment.

FIG. 4 now describes one potential implementation of a mobile device 400 according to certain embodiments. Mobile device 400 of FIG. 4 may be used in any embodiment of FIGS. 1-3. Mobile device 400 may thus, for certain embodiments, be examples of mobile devices 110, 210, and 310. Further, mobile device 400 may also implement processing for determining direction vectors and base station position values according to various embodiments described herein Additional details of such processes which may be initiated and managed by Doppler positioning module 421 are described below with respect to FIGS. 5-6 in addition to any other description of such processes associated with the systems of FIGS. 1-3 above.

In the embodiment shown at FIG. 4, mobile device 400 includes processor 410 configured to execute instructions for performing operations at a number of components and can be, for example, a general-purpose processor or microprocessor suitable for implementation within a portable electronic device. Processor 410 is communicatively coupled with a plurality of components within mobile device 400. To realize this communicative coupling, processor 410 may communicate with the other illustrated components across a bus 440. Bus 440 can be any subsystem adapted to transfer data within mobile device 400. Bus 440 can be a plurality of computer buses and include additional circuitry to transfer data.

Memory 420 may be coupled to processor 410. In some embodiments, memory 420 offers both short-term and long-term storage and may in fact be divided into several units. Memory 420 may be volatile, such as static random access memory (SRAM) and/or dynamic random access memory (DRAM) and/or non-volatile, such as read-only memory (ROM), flash memory, and the like. Furthermore, memory 420 can include removable storage devices, such as secure digital (SD) cards. Thus, memory 420 provides storage of computer readable instructions, data structures, program modules, and other data for mobile device 400. In some embodiments, memory 420 may be distributed into different hardware modules.

In some embodiments, memory 420 stores a plurality of application modules 421 and 424, which may be any number of applications. Application modules contain particular instructions to be executed by processor 410. In alternative embodiments, other hardware modules 401 may additionally execute certain applications or parts of applications. In certain embodiments, memory 420 may additionally include secure memory, which may include additional security controls to prevent copying or other unauthorized access to secure information such as secure locations of bases stations that is not public or not expected to be shared outside of a secure environment.

In some embodiments, memory 420 includes an operating system 423. Operating system 423 may be operable to initiate the execution of the instructions provided by application modules and/or manage other hardware modules 401 as well as interfaces with communication modules which may use WAN wireless transceiver 412 and LAN wireless transceiver 442 to receive information from link 416 via antenna 414 and/or link 446 via antenna 444 respectively. Operating system 423 may be adapted to perform other operations across the components of mobile device 400 including threading, resource management, data storage control and other similar functionality.

In additional embodiments WAN wireless transceiver 412 and LAN wireless transceiver 442 may receive information from link 416 via antenna 414 and/or link 446 via antenna 444 respectively which may be passed directly to position/velocity hardware 430 which may include specialized hardware, software, or firmware modules for Doppler measurements, position determination, or velocity determination. In alternative embodiments, signals from antennas may be communicated to a memory 420 for later access and processing by processor 410 executing Doppler positioning module to determine direction vectors and base station positions in accordance with the embodiments described herein.

In still further embodiments, specialized modules may implement communications which are integrated with Doppler measurements. For example, in certain embodiments, the wireless transceivers may receive signals associated with a particular communications standard. Such signals may include known standard reference signals which may provide standardized non-data reference signals which may be adapted for Doppler measurements. Certain standards, for example non-data reference signals such as a Positioning Reference Signal (PRS), a Cell Specific Reference Signal (CRS), a primary synchronization signal (PSS), or a secondary synch signal (SSS). PRS, CRS, PSS, SSS signals, as one potential example, are illustrated by standard 3GPP 36.211 V10.0.0 (2011-01). Other communication systems such as code division multiple access systems may use pilot reference signals. When these signals are received, a Doppler measurement may be made on these signals, and that measurement may then be used for direction vector determination and base station location determination.

Further still, in certain embodiments, a local stable clock may be used or provided for such Doppler measurements. This may be provided as part of other location systems, such as an implementation of GNSS or satellite positioning, or provided as part of a communication system such as a clock frequency referenced off of a WAN signal, but in other embodiments GNSS clock, hardware, and other functionality may be completely separate from the stable local clock source with is used for locating a base station using Doppler measurements. In such separate embodiments, the GNSS and Doppler measurement functionality may be completely separate, or the output information may be combined to enable additional location functionality of improved accuracy where both location services are available.

In some embodiments, mobile device 400 includes a plurality of other hardware modules 401. Each of other hardware modules 401 is a physical module within mobile device 400.

However, while each of hardware modules 401 is permanently configured as a structure, a respective one of hardware modules 401 may be temporarily configured to perform specific functions or temporarily activated. A common example is an application module that may program a camera module (i.e., hardware module) for shutter release and image capture. A respective one of hardware modules 301 can be, for example, an accelerometer, a Wi-Fi transceiver, a satellite navigation system receiver (e.g., a GPS module), a pressure module, a temperature module, an audio output and/or input module (e.g., a microphone), a camera module, a proximity sensor, an alternate line service (ALS) module, a capacitive touch sensor, a near field communication (NFC) module, a Bluetooth transceiver, a cellular transceiver, a magnetometer, a gyroscope, an inertial sensor (e.g., a module the combines an accelerometer and a gyroscope), an ambient light sensor, a relative humidity sensor, or any other similar module operable to provide sensory output and/or receive sensory input. In some embodiments, one or more functions of the hardware modules 401 may be implemented in software.

In certain embodiments, hardware modules 401 and/or position/velocity hardware 430 may include specialized functionality for determining the velocity of mobile device 400 as part of an embodiment for base station location with Doppler measurements. Such components may be accelerometers, inertial sensors, gyroscopes, or other such devices described above which are configured to work alone or in combination to provide accurate velocity measurements in conjunction with corresponding Doppler measurements.

Mobile device 400 may include a component such as wireless communication module which may integrate antenna 414 and wireless transceiver 412 with any other hardware, firmware, or software necessary for wireless communications. Such a wireless communication module may be configured to receive signals from various devices such data sources via networks and access points. In addition to other hardware modules 401 and applications 424 in memory 420, mobile device 400 may have a display module 403 and a user input module 404. Display module 403 graphically presents information from mobile device 400 to the user. This information may be derived from one or more applications 424, one or more hardware modules 401, a combination thereof, or any other suitable means for resolving graphical content for the user (e.g., by operating system 423). Display module 403 can be liquid crystal display (LCD) technology, light emitting polymer display (LPD) technology, or some other display technology. In some embodiments, display module 403 is a capacitive or resistive touch screen and may be sensitive to haptic and/or tactile contact with a user. In such embodiments, the display module 403 can comprise a multi-touch-sensitive display. Display output 403 may then be used to settings, output information, or other user interface components of Doppler positioning module 421.

Additional potential embodiments of a mobile device may further comprise various portions of computing devices as are detailed below with respect to FIG. 6 and networks as detailed in FIG. 7.

Figure 5B:
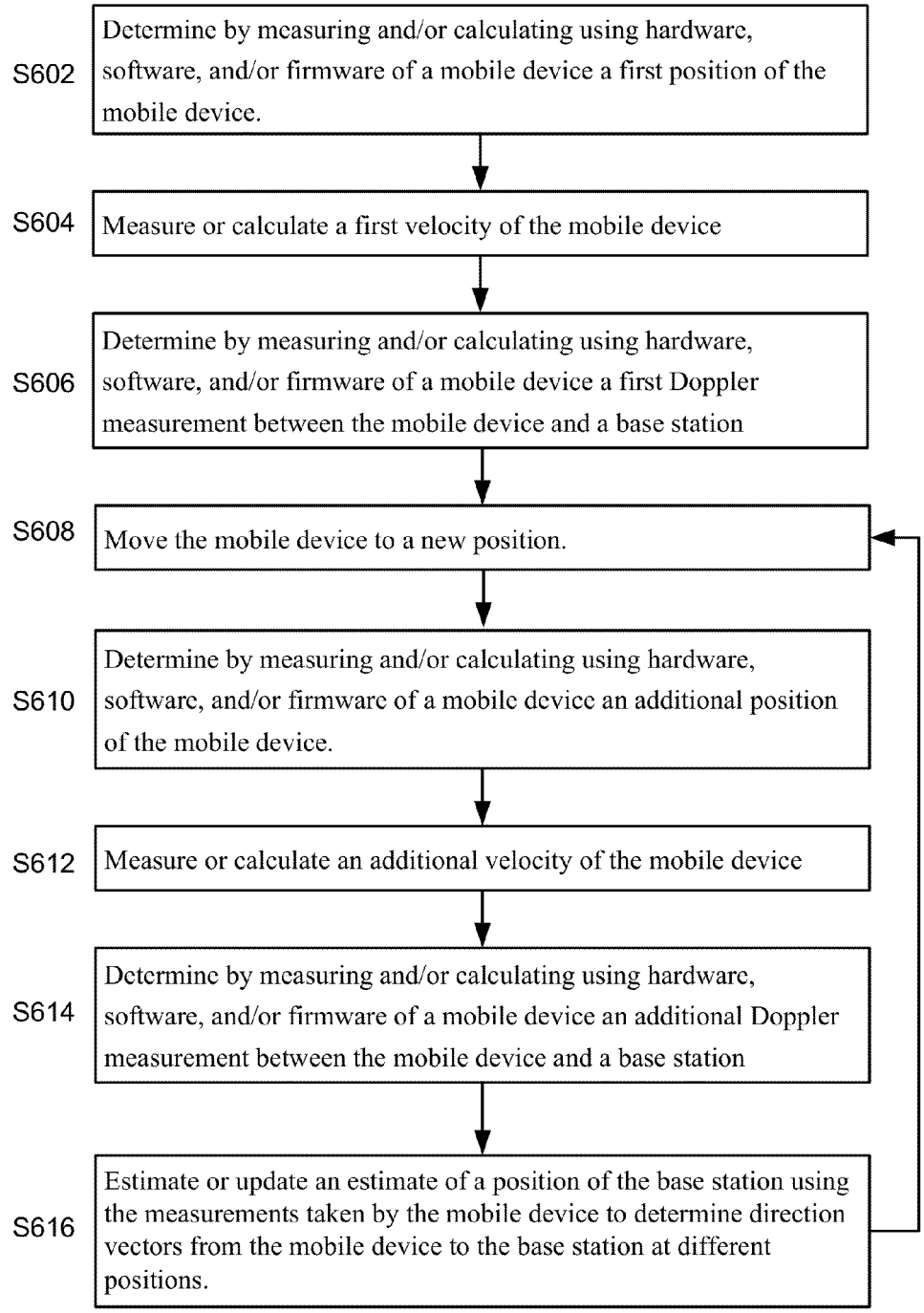
FIG. 5B describes on potential method according to the embodiments described herein.

FIGS. 5A and 5B show embodiments of methods for base station location. As shown by FIG. 5, S502 involves determining within a first time period, by one mobile device, (a) a first velocity associated with the mobile device and a first position and (b) a first Doppler measurement between the mobile device and a base station, wherein the first Doppler measurement is referenced to a local stable clock signal of the mobile device. These determinations may be done using any hardware, software, or firmware within a mobile device to implement any measurements or outputs derived from measurements as described herein. While the velocity and Doppler measurements are intended to represent measurements at a particular instant, in various embodiments the measurements may occur within or across a time period. The period may be determined by a time needed to perform the measurements, or by the need for mobile device resources to perform separate measurements serially. Such a time period may be in the order of milliseconds, but may be much longer, more than a second, depending on the allowable uncertainty in the measurements and the stability of the mobile device velocity.

S504 then involves determining within a second time period, by the mobile device, (c) a second velocity associated with the mobile device and a second position and (d) a second Doppler measurement between the mobile device and the base station, wherein the second Doppler measurement is referenced to the local stable clock signal of the mobile device wherein a first direction vector from the first position to the position of the base station is different from a second direction vector from the second position to the position of the base station. This is essentially a repeat measurement, with the addition of a location measurement relative to the location of the first set of measurements being taken. The second location may be completely relative within a set of coordinates created by the mobile device, or may be global measurements.

S506 additionally occurs at a second time period. The distance in time between the first time period and the second time period may be any time period, but over time the clock my introduce errors, even an extremely stable clock. Certain embodiments may thus define a maximum time difference between Doppler and velocity measurements to reduce errors introduced by drift in the clock used for the measurement.

In S508, the method of FIG. 5A involves determining a position of the base station from at least the first velocity, the second velocity, the first position, the second position, the first Doppler measurement, and the second Doppler measurement as described in more detail above.

FIG. 5B describes another alternative method in accordance with the embodiments described herein. In S602, a mobile device may determine by measuring and/or calculating using hardware, software, and/or firmware of the mobile device a first position of the mobile device. In S604, the device may measure or calculate a first velocity of the mobile device and thin in S606 may determine by measuring and/or calculating using hardware, software, and/or firmware of a mobile device a first Doppler measurement between the mobile device and a base station.

In S608 the mobile device moves to a new position. In S610, S612, and S614, the measurement steps of S602, 604, and 606 are essentially repeated from the new position. In S616, the device may estimate or update an estimate of a position of the base station using the measurements taken by the mobile device to determine direction vectors from the mobile device to the base station at different positions. Following S616, the system may continuously loop back to S608, whereas the device moves additional measurements may be taken. In certain embodiments, a mobile device may be set to take periodic measurements, for example, every few seconds. Stationary or otherwise faulty data may be deleted, and the data stored for future use and calculation of base station location by a separate device, or used for real time base station location by the mobile device. In other embodiments, a system may only take measurements when the mobile device is moving at a fairly constant velocity, when the mobile device has moved beyond a threshold distance or angle from a previous measurement, or based on any other such threshold for repetition of measurements.

In various embodiments, after the measurements have been taken, they may be stored in a database, communicated to a networked computer, or used by the mobile device for additional location determinations. In further embodiments, a mobile device may simultaneously or serially take measurements for multiple different base stations if a given location is within acceptable communication distance of multiple base stations. In still further embodiments, the measurements may be used to verify previously stored base station location information. If conflicting information is identified, the information may be flagged for later review.

Figure 6:
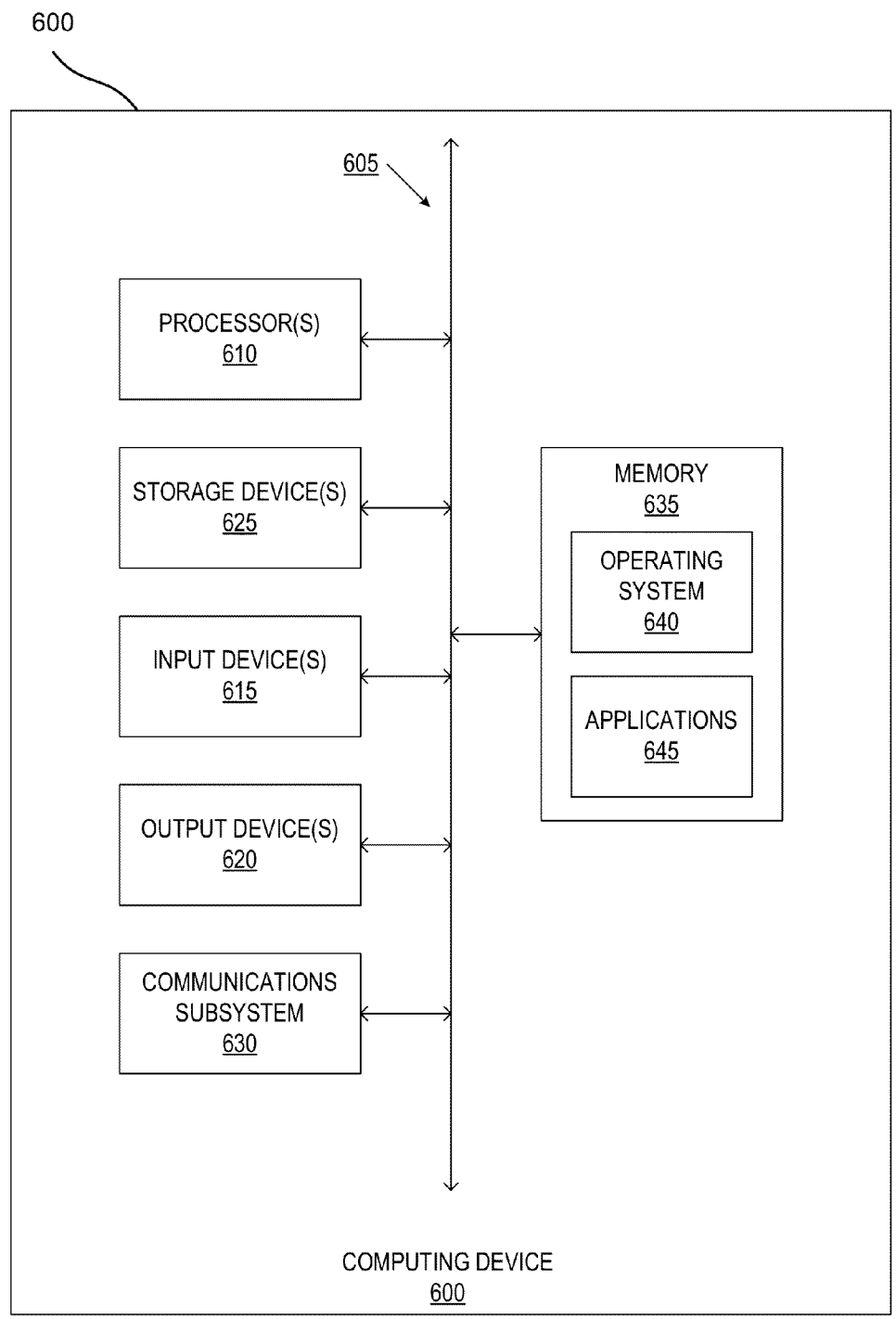
FIG. 6 is one potential implementation of a computer device according to certain embodiments.

FIG. 6 provides a schematic illustration of one embodiment of a computing device 600 that can perform the methods provided by various other embodiments such as the embodiments described by FIGS. 1-3 as described herein. FIG. 6 is meant only to provide a generalized illustration of various components, any or all of which may be utilized as appropriate. FIG. 6, therefore, broadly illustrates how individual system elements may be implemented in a relatively separated or relatively more integrated manner, and describes elements that may implement specific methods according to embodiments of the invention when, for example, controlled by computer readable instructions from a non-transitory computer readable storage device such as storage devices 625.

The computing device 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard and/or the like; and one or more output devices 620, which can include without limitation a display device, a printer and/or the like.

The computing device 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computing device 600 might also include a communications subsystem 630, which can include without limitation a modem, a network card (wireless or wired), an infrared communication device, a wireless communication device and/or chipset (such as a Bluetooth® device, a 702.11 device, a Wi-Fi device, a WiMax device, cellular communication facilities, etc.), and/or similar communication interfaces. The communications subsystem 630 may permit data to be exchanged with a network (such as the network described below, to name one example), other computer systems, and/or any other devices described herein. A mobile device such as mobile device 400 may thus include other communication subsystems in addition to those including wireless transceiver 412 and LAN wireless transceiver 442.

In many embodiments, the computing device 600 will further comprise a non-transitory working memory 635, which can include a RAM or ROM device, as described above. The computing device 600 also can comprise software elements, shown as being currently located within the working memory 635, including an operating system 640, device drivers, executable libraries, and/or other code, such as one or more applications 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods for using Doppler measurables for base station location.

A set of these instructions and/or code might be stored on a computer-readable storage medium, such as the storage device(s) 625 described above. In some cases, the storage medium might be incorporated within a computer system, such as computing device 600. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computing device 600 and/or might take the form of source and/or installable code, which, upon compilation and/or installation on the computing device 600 (e.g., using any of a variety of generally available compilers, installation programs, compression/decompression utilities, etc.) then takes the form of executable code. Doppler positioning module 421 may thus be executable code as described herein.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. An activity selection subsystem configured to provide some or all of the features described herein relating to the selection of acceptable characteristics for an output 3D image created from multiple two dimensional sources, and such subsystems comprise hardware and/or software that is specialized (e.g., an application-specific integrated circuit (ASIC), a software method, etc.) or generic (e.g., processor(s) 719100, applications 645 which may for example, implement any module within memory 420, etc.) Further, connection to other computing devices such as network input/output devices may be employed.

The terms "machine-readable medium" and "computer-readable medium," as used herein, refer to any medium that participates in providing data that causes a machine to operate in a specific fashion. In an embodiment implemented using the computing device 600, various computer-readable media might be involved in providing instructions/code to processor(s) 610 for execution and/or might be used to store and/or carry such instructions/code (e.g., as signals). In many implementations, a computer-readable medium is a physical and/or tangible storage medium. Such a medium may take many forms, including but not limited to, non-volatile media, non-transitory media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire and fiber optics, including the wires that comprise the bus 605, as well as the various components of the communications subsystem 630 (and/or the media by which the communications subsystem 630 provides communication with other devices).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code. Any such memory may function as memory 420 or as secure memory if structured to maintain security of stored content.

The communications subsystem 630 (and/or components thereof) generally will receive the signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processor(s) 610.

In various embodiments as described herein, computing devices may be networked in order to communicate information. For example, mobile device 400 may be networked to receive information as described above. Additionally, each of these elements may engage in networked communications with other devices such as web servers, databases, or computers which provide access to information to enable applications via network.

Figure 7:
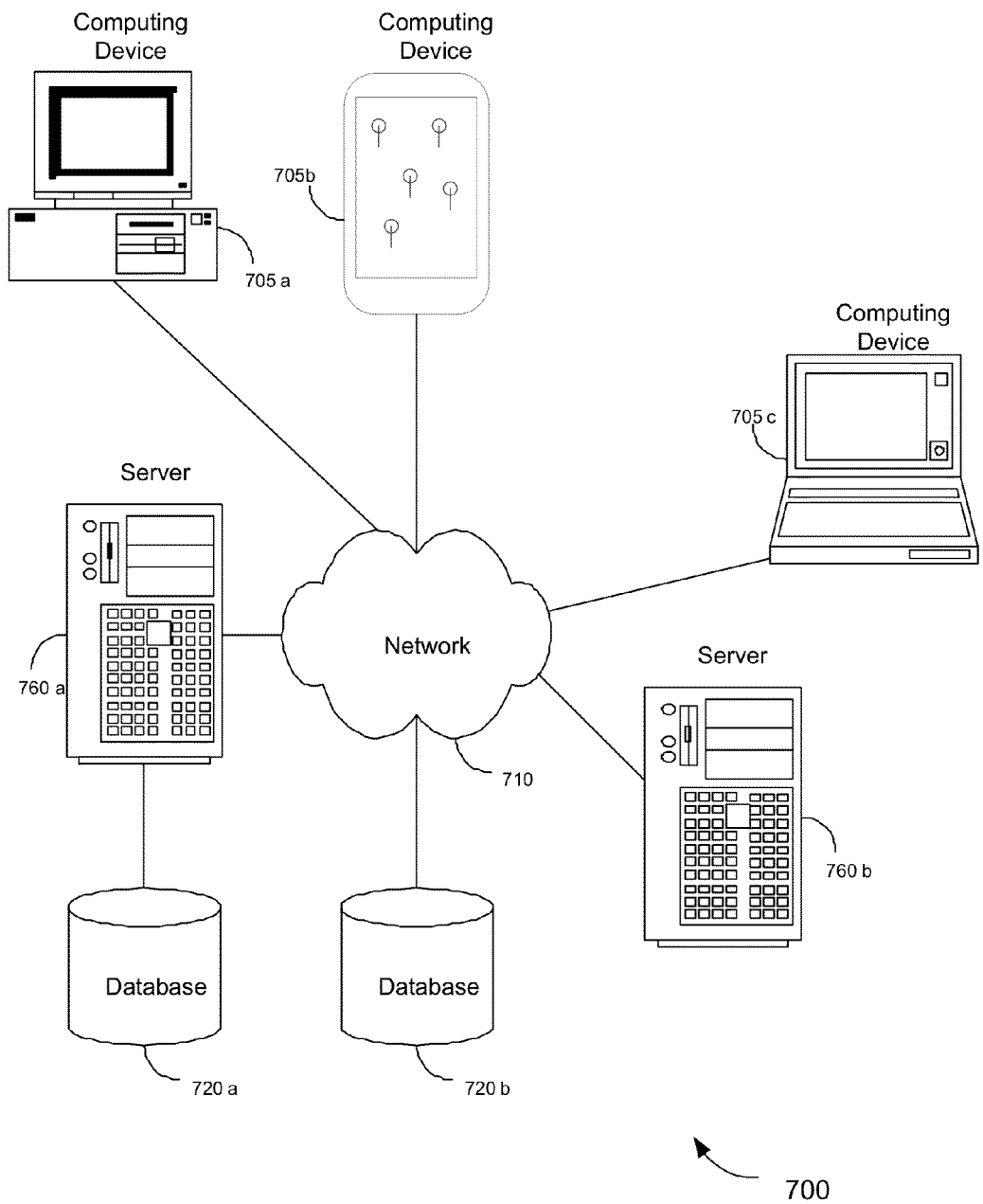
FIG. 7 is one potential implementation of a networked computer system according to certain embodiments.

FIG. 7 illustrates a schematic diagram of a system 700 of networked computing devices that can be used in accordance with various embodiments to enable systems such as system 700 or other systems that may implement base station location using Doppler observables. For example, in various embodiments, the output location information may be communicated via networked computers to one or more databases as described by system 700. The system 700 can include one or more user computing devices 705. The user computing devices 705 can be general purpose personal computers (including, merely by way of example, personal computers and/or laptop computers running any appropriate flavor of Microsoft Corp.'s Windows® and/or Apple Corp.'s Macintosh® operating systems) and/or workstation computers running any of a variety of commercially-available UNIX™ or UNIX-like operating systems. These user computing devices 705 can also have any of a variety of applications, including one or more applications configured to perform methods of the invention, as well as one or more office applications, database client and/or server applications, and web browser applications. Alternatively, the user computing devices 705 can be any other electronic device, such as a thin-client computer, Internet-enabled mobile telephone, and/or personal digital assistant (PDA), capable of communicating via a network (e.g., the network 710 described below) and/or displaying and navigating web pages or other types of electronic documents. Although the exemplary system 700 is shown with three user computing devices 705, any number of user computing devices can be supported.

Certain embodiments of the invention operate in a networked environment, which can include a network 710. The network 710 can be any type of network familiar to those skilled in the art that can support data communications using any of a variety of commercially-available protocols, including, without limitation, TCP/IP, SNA, IPX, AppleTalk, and the like. Merely by way of example, the network 810 can be a local area network ("LAN"), including, without limitation, an Ethernet network, a Token-Ring network and/or the like; a wide-area network (WAN); a virtual network, including, without limitation, a virtual private network ("VPN"); the Internet; an intranet; an extranet; a public switched telephone network ("PSTN"); an infrared network; a wireless network, including, without limitation, a network operating under any of the IEEE 802.11 suite of protocols, the Bluetooth® protocol known in the art, and/or any other wireless protocol; and/or any combination of these and/or other networks. Network 710 may include access points such as access point 110 for enabling access to network 710 by various computing devices.

Embodiments of the invention can include one or more server computers 760. Each of the server computers 760 may be configured with an operating system, including, without limitation, any of those discussed above, as well as any commercially (or freely) available server operating systems. Each of the server computers 760 may also be running one or more applications, which can be configured to provide services to one or more user computing devices 705 and/or other server computers 860.

Merely by way of example, one of the server computers 760 may be a web server, which can be used, merely by way of example, to process requests for web pages or other electronic documents from user computing devices 705. The web server can also run a variety of server applications, including HTTP servers, FTP servers, CGI servers, database servers, Java® servers, and the like. In some embodiments of the invention, the web server may be configured to serve web pages that can be operated within a web browser on one or more of the user computing devices 705 to perform methods of the invention. Such servers may be associated with particular IP addresses, or may be associated with modules having a particular URL, and may thus store secure navigation modules which may interact with a mobile device such as mobile device 400 to provide secure indications of geographic points as part of location services provided to mobile device 400.

In accordance with further embodiments, one or more server computers 760 can function as a file server and/or can include one or more of the files (e.g., application code, data files, etc.) necessary to implement methods of various embodiments incorporated by an application running on a user computing device 705 and/or another server computer 760. Alternatively, as those skilled in the art will appreciate, a file server can include all necessary files, allowing such an application to be invoked remotely by a user computing device 705 and/or server computer 760. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720. The location of the database(s) 720 is discretionary: merely by way of example, a database 720a might reside on a storage medium local to (and/or resident in) a server 760a (and/or a user computing device 705). Alternatively, a database 720b can be remote from any or all of the user computing devices 705 or server computers 760, so long as the database 720b can be in communication (e.g., via the network 710) with one or more of these. In a particular set of embodiments, a database 720 can reside in a storage-area network ("SAN") familiar to those skilled in the art. (Likewise, any necessary files for performing the functions attributed to the user computing devices 705 or server computers 760 can be stored locally on the respective computer and/or remotely, as appropriate.) In one set of embodiments, the database 720 can be a relational database, such as an Oracle® database, that is adapted to store, update, and retrieve data in response to SQL-formatted commands. The database might be controlled and/or maintained by a database server, as described above, for example. Such databases may store information relevant to levels of security.

For example, in one potential embodiment, server 760a may be an server that stores a base station almanac in a database. Mobile devices practicing various embodiments as described herein may communicate the locations of one or more base stations to such a database via a network such as network 710. When the server receives the base station location information, the server may determine if any other information is already stored relating to the location of the particular base station. If there is no information about the base station in the database, a new entry may be created for the base station almanac with the base station location from the mobile device. If an entry is already present for the particular base station, a variety of different uses may be made of the information. In certain embodiments, the new information may be used to verify the previous information is correct. In other embodiments, if the new information conflicts with the previous information, a flag may be set that further information is needed.

In other alternative embodiments, the mobile device may query such a database before measuring the base station location. A measurement may be taken only if no information is currently in the database. In still further embodiments, the mobile device may both query the database and take a measurement, but the measurement may only be sent to the database if the mobile device receives a message that there is no current base station location stored, or if the currently stored base station information conflicts with the measurement made with the mobile device by more than a threshold amount.

The base station location sent to the server may be relative coordinate information that is sent with a reference measurement or other details for the mobile device such that the server may use the supplemental details to determine the absolute position of the base station. Alternatively, the absolute position of the base station may be determined by the phone, and only this absolute position may be communicated to the server for inclusion in the base station almanac of the database.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner.

Specific details are given in the description to provide a thorough understanding of the embodiments. However, embodiments may be practiced without certain specific details. For example, well-known circuits, processes, algorithms, structures, and techniques have been mentioned without unnecessary detail in order to avoid obscuring the embodiments. This description provides example embodiments only, and is not intended to limit the scope, applicability, or configuration of various embodiments. Rather, the preceding description of the embodiments will provide those skilled in the art with an enabling description for implementing embodiments. Various changes may be made in the function and arrangement of elements without departing from the spirit and scope of various embodiments.

Also, some embodiments were described as processes depicted in a flow with process arrows. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks. Additionally, the above elements may merely be a component of a larger system, wherein other rules may take precedence over or otherwise modify the application various embodiments, and any number of steps may be undertaken before, during, or after the elements of any embodiment are implemented.

Having described several embodiments, it will therefore be clear to a person of ordinary skill that various modifications, alternative constructions, and equivalents may be used without departing from the spirit of the disclosure.

What is claimed is:

1. A method comprising:
   determining within a first time period, by a mobile device, (a) a first velocity associated with the mobile device and a first position and (b) a first Doppler measurement between the mobile device and a base station, wherein the first Doppler measurement is referenced to a local stable clock signal of the mobile device;
   determining within a second time period, by the mobile device, (c) a second velocity associated with the mobile device and a second position and (d) a second Doppler measurement between the mobile device and the base station, wherein the second Doppler measurement is referenced to the local stable clock signal of the mobile device; and
   determining a position of the base station from at least the first velocity, the second velocity, the first position, the second position, the first Doppler measurement, and the second Doppler measurement;
   wherein a first direction vector from the first position to the position of the base station is different from a second direction vector from the second position to the position of the base station.

2. The method of claim 1 further comprising:
   determining within a third time period, by the mobile device, a third velocity of the mobile device and a third Doppler measurement between the mobile device and the base station from a third position;
   wherein the third position is associated with a third direction vector from the third position to the base station, and wherein the third direction vector is different from both the first direction vector and the second direction vector.

3. The method of claim 1 further comprising:
   communicating, by the mobile device, the position of the base station via a wireless network to a database in a server, wherein the database comprises a base station almanac.

4. The method of claim 1 wherein the first position is an indoor position wherein the indoor position obstructs reception of any potential satellite positioning signal.

5. The method of claim 1 wherein the first velocity is determined from an accelerometer of the mobile device.

6. The method of claim 1 wherein the first time period and the second time period occur within a predetermined time difference, the predetermined time difference being based on a stability of the local stable clock signal.

7. The method of claim 1 wherein the mobile device comprises a first clock associated with a global positioning system component, and a second clock that is separate from the global positioning system component;
wherein the local stable clock signal is associated with the second clock that is separate from the global positioning system component.

8. The method of claim 1 wherein the first position is a relative position in a relative coordinate system defined by the mobile device, and wherein the second position is determined relative to the first position within the relative coordinate system.

9. The method of claim 8 further comprising:
determining a global reference point for the relative coordinate system; and
determining a global position of the base station using the position of the base station and the global reference point.

10. The method of claim 8 further comprising:
receiving a global position of the base station from the base station; and
determining a global position of the mobile device using the global position of the base station and the position of the base station determined relative to the mobile device using the first Doppler measurement and the second Doppler measurement.

11. The method of claim 1 wherein the first Doppler measurement is performed using a non-data reference signal communicated between the mobile device and the base station.

12. The method of claim 11 wherein the non-data reference signal is a Positioning Reference Signal (PRS), Cell Specific Reference Signal (CRS), primary synchronization signal (PSS), or secondary synch signal (SSS).

13. The method of claim 11 wherein the non-data reference signal is a pilot reference signal as part of a code division multiple access system.

14. A mobile device comprising:
a memory;
a velocity hardware module used to determine a first velocity associated with the mobile device and a first position and a second velocity associated with the mobile device and a second position, wherein the velocity hardware module is coupled to the memory;
a Doppler positioning module used to take a first Doppler measurement between the mobile device and a base station from the first position and a second Doppler measurement between the mobile device and the base station from the second position,
wherein the first Doppler measurement and the second Doppler measurement are referenced to a local stable clock signal of the mobile device, and wherein the Doppler positioning module is coupled to the memory; and
a processor coupled to the memory, the velocity hardware module, and the Doppler positioning module, wherein the processor is configured to determine a position of the base station from at least the first velocity, the second velocity, the first position, the second position, the first Doppler measurement, and the second Doppler measurement;
wherein the first Doppler measurement is associated with the first velocity and each is measured within a first time period;
wherein the second Doppler measurement is associated with the second velocity and each is measured within a second time period that is different from the first time period; and
wherein a first direction vector from the first position to the position of the base station is different from a second direction vector from the second position to the position of the base station.

15. The mobile device of claim 14 wherein the velocity hardware module comprises an inertial sensor.

16. The mobile device of claim 14 wherein the velocity hardware module comprises a gyroscope.

17. The mobile device of claim 14 further comprising:
a global positioning system module coupled to the processor, wherein the global positioning system module comprises a clock source that is separate from a source of the local stable clock signal.

18. A mobile device comprising:
means for determining within a first time period, by the mobile device, (a) a first velocity associated with the mobile device and a first position and (b) a first Doppler measurement between the mobile device and a base station, wherein the first Doppler measurement is referenced to a local stable clock signal of the mobile device;
means for determining within a second time period, by the mobile device, (c) a second velocity associated with the mobile device and a second position and (d) a second Doppler measurement between the mobile device and the base station, wherein the second Doppler measurement is referenced to the local stable clock signal of the mobile device; and
means for determining a position of the base station from at least the first velocity, the second velocity, the first position, the second position, the first Doppler measurement, and the second Doppler measurement;
wherein a first direction vector from the first position to the position of the base station is different from a second direction vector from the second position to the position of the base station.

19. The mobile device of claim 18 further comprising:
means for determining within a third time period, by the mobile device, a third velocity of the mobile device and a third Doppler measurement between the mobile device and the base station from a third position;
wherein the third position is associated with a third direction vector from the third position to the base station,
wherein the third direction vector is different from both the first direction vector and the second direction vector; and
wherein the first position is an indoor position wherein the indoor position obstructs reception of any potential satellite positioning signal.

20. The mobile device of claim 18 further comprising:
means for determining a global reference point for a relative coordinate system; and
means for determining a global position of the base station using the position of the base station and the global reference point.

21. The mobile device of claim 18 further comprising:
means for receiving a global position of the base station from the base station; and
means for determining a global position of the mobile device using the global position of the base station and the position of the base station determined relative to the mobile device using the first Doppler measurement and the second Doppler measurement.

22. A non-transitory computer readable medium comprising instructions that, when executed by a processor, cause a mobile device comprising the processor to:

determine, within a first time period, (a) a first velocity associated with the mobile device and a first position and (b) a first Doppler measurement between the mobile device and a base station, wherein the first Doppler measurement is referenced to a local stable clock signal of the mobile device;

determine within a second time period (c) a second velocity associated with the mobile device and a second position and (d) a second Doppler measurement between the mobile device and the base station, wherein the second Doppler measurement is referenced to the local stable clock signal of the mobile device; and determine a position of the base station from at least the first velocity, the second velocity, the first position, the second position, the first Doppler measurement, and the second Doppler measurement;

wherein a first direction vector from the first position to the position of the base station is different from a second direction vector from the second position to the position of the base station.

23. The non-transitory computer readable medium of claim 22 wherein the first Doppler measurement is performed using a non-data reference signal communicated between the mobile device and the base station.

24. The non-transitory computer readable medium of claim 23 wherein the non-data reference signal is a Positioning Reference Signal (PRS), Cell Specific Reference Signal (CRS), Primary Synchronization Signal (PSS), or Secondary Synch Signal (SSS).

25. The non-transitory computer readable medium of claim 23 wherein the non-data reference signal is a pilot reference signal as part of a code division multiple access system.

* * * * *